US009098556B2

(12) United States Patent
Topatan et al.

(10) Patent No.: US 9,098,556 B2
(45) Date of Patent: Aug. 4, 2015

(54) INDEXING AND SEARCHING DYNAMICALLY CHANGING SEARCH CORPORA

(71) Applicant: Microsoft Corporation, Redmond, WA (US)

(72) Inventors: Kutlay Topatan, Seattle, WA (US); Zhifeng Wang, Sammamish, WA (US); Rudra Raj Mitra, Redmond, WA (US); Michal Mieczyslaw Malinowski, Bellevue, WA (US); Weiye Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/068,904

(22) Filed: Oct. 31, 2013

(65) Prior Publication Data

US 2014/0059045 A1    Feb. 27, 2014

Related U.S. Application Data

(63) Continuation of application No. 12/353,987, filed on Jan. 15, 2009, now Pat. No. 8,589,392.

(51) Int. Cl.
*G06F 17/30* (2006.01)
*G06F 21/62* (2013.01)

(52) U.S. Cl.
CPC .... *G06F 17/30554* (2013.01); *G06F 17/30011* (2013.01); *G06F 17/3053* (2013.01); *G06F 17/30613* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 5,752,242 A | 5/1998 | Havens | |
| 7,035,839 B1 | 4/2006 | Gillespie et al. | |
| 7,593,924 B2 * | 9/2009 | Kishore et al. | ........................ 1/1 |
| 2002/0083042 A1 | 6/2002 | Sasoh | |
| 2005/0027696 A1 | 2/2005 | Swaminathan et al. | |

(Continued)

FOREIGN PATENT DOCUMENTS

| | | |
|---|---|---|
| CN | 1752974 A | 3/2006 |
| EA | 009793 B1 | 4/2008 |

(Continued)

OTHER PUBLICATIONS

European Search Report dated May 15, 2013 in European Application No. 09838556.0.

(Continued)

*Primary Examiner* — Richard Bowen
(74) *Attorney, Agent, or Firm* — Tom Wong; Jim Ross; Micky Minhas

(57) ABSTRACT

Tools and techniques for indexing and searching dynamically changing search corpora are provided. These tools may receive requests to upload documents over a network to an online document repository, and present a user interface to facilitate the upload. The user interface may include devices that are responsive to user activation to grant permission to at least one other user to search for content contained within the documents. Through the user interface, these tools may receive selections from the user related to granting the permission, with the documents being associated with share parameters that incorporate the user selections. Finally, the tools may receive identifications of the documents to be uploaded.

20 Claims, 10 Drawing Sheets

(56) References Cited

U.S. PATENT DOCUMENTS

| | | |
|---|---|---|
| 2005/0091316 A1 | 4/2005 | Ponce et al. |
| 2006/0117247 A1 | 6/2006 | Fite et al. |
| 2006/0294192 A1 | 12/2006 | Mao et al. |
| 2007/0011155 A1 | 1/2007 | Sarkar |
| 2007/0033191 A1 | 2/2007 | Hornkvist et al. |
| 2007/0055926 A1 | 3/2007 | Christiansen et al. |
| 2007/0074122 A1 | 3/2007 | Nichols et al. |
| 2008/0005064 A1 | 1/2008 | Sarukkai |
| 2008/0091761 A1 | 4/2008 | Tsao |
| 2008/0103875 A1 | 5/2008 | Kokernak et al. |
| 2008/0104408 A1 | 5/2008 | Mayer |
| 2008/0168048 A1 | 7/2008 | Bell et al. |
| 2008/0183680 A1 | 7/2008 | Meynier et al. |
| 2009/0006356 A1 | 1/2009 | Liao et al. |
| 2009/0144657 A1 | 6/2009 | Zhang et al. |
| 2010/0223261 A1 | 9/2010 | Sarkar |

FOREIGN PATENT DOCUMENTS

| | | |
|---|---|---|
| KR | 10-2003-0051710 A | 6/2003 |
| KR | 10-2007-0106359 A | 11/2007 |
| WO | WO 2005/103867 A1 | 11/2005 |
| WO | WO 2007/093035 A | 8/2007 |

OTHER PUBLICATIONS

Chinese Office Action dated Jun. 24, 2013 in Chinese Application No. 200980154857.6.

Chinese Official Action dated Oct. 10, 2012 in Chinese Application No. 200980154857.6.

"International Search Report", Mailed Date: Jul. 1, 2010, Application No. PCT/US2009/066890, Filed Date: Dec. 4, 2009, pp. 11.

"How to Share and Set Permissions for Folders and Files using Windows XP", retrieved at <<http://technet.microsoft.com/en-us/library/bb456988.aspx>>, Nov. 6, 2001, pp. 1-3.

"Search Shared Files", retrieved at <<http://search-shared-files.garchive.org/>>, Oct. 14, 2008, pp. 1-4.

Rohini, U.; Varma, V., "A Novel Approach for Re-Ranking of Search Results Using Collaborative Filtering," Computing: Theory and Applications, 2007. ICCTA '07. International Conference on, vol., No., pp. 491 ,496,Mar. 5-7, 2007.

Conner, Nancy, "Google Apps: The Missing Manual, 1st Edition," Chapter 1, Jun. 3, 2008, all pages.

Conner, Nancy, "Google Apps: The Missing Manual, 1st Edition," Chapters Introduction, 2.2, 2.4, 2.7 and 2.8, Jun. 3, 2008, all pages.

U.S. Notice of Allowance dated Jul. 8, 2013 in U.S. Appl. No. 12/353,987.

U.S. Official Action dated Jan. 25, 2013 in U.S. Appl. No. 12/353,987.

U.S. Official Action dated Jul. 27, 2011 in U.S. Appl. No. 12/353,987.

U.S. Official Action dated Feb. 2, 2011 in U.S. Appl. No. 12/353,987.

Mexican Official Action dated Jul. 8, 2013 in Mexican Application No. MX/a/2011/007387.

Chinese Official Action dated Dec. 10, 2013 in Chinese Application No. 200980154857.6.

Russian Official Action dated Jan. 21, 2014 in Russian Application No. 2011129313.

Chinese Official Action dated May 5, 2014 in Chinese Patent Application No. 200980154857.6.

Russian Notice of Allowance dated Oct. 8, 2014 in Russian Application No. 2011129313.

\* cited by examiner

INDEXING AND SEARCHING DYNAMICALLY CHANGING SEARCH CORPORA

CROSS REFERENCE TO RELATED APPLICATIONS

This application is continuation of co-pending U.S. application Ser. No. 12/353,987 filed Jan. 15, 2009 entitled "Indexing and Searching Dynamically Changing Search Corpora" which is expressly incorporated herein by reference.

BACKGROUND

A variety of search engines is currently available for performing keyword searches on various data stores. However, these search engines generally treat users as anonymous entities, and typically return the same results without regard to which particular users are performing a given query.

SUMMARY

Tools and techniques for indexing and searching dynamically changing search corpora are provided. These tools may receive requests to upload documents over a network to an online document repository, and present a user interface to facilitate the upload. The user interface may include devices that are responsive to user activation to grant permission to at least one other user to search for content contained within the documents. Through the user interface, these tools may receive selections from the user related to granting the permission, with the documents being associated with share parameters that incorporate the user selections. Finally, the tools may receive identifications of the documents to be uploaded It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
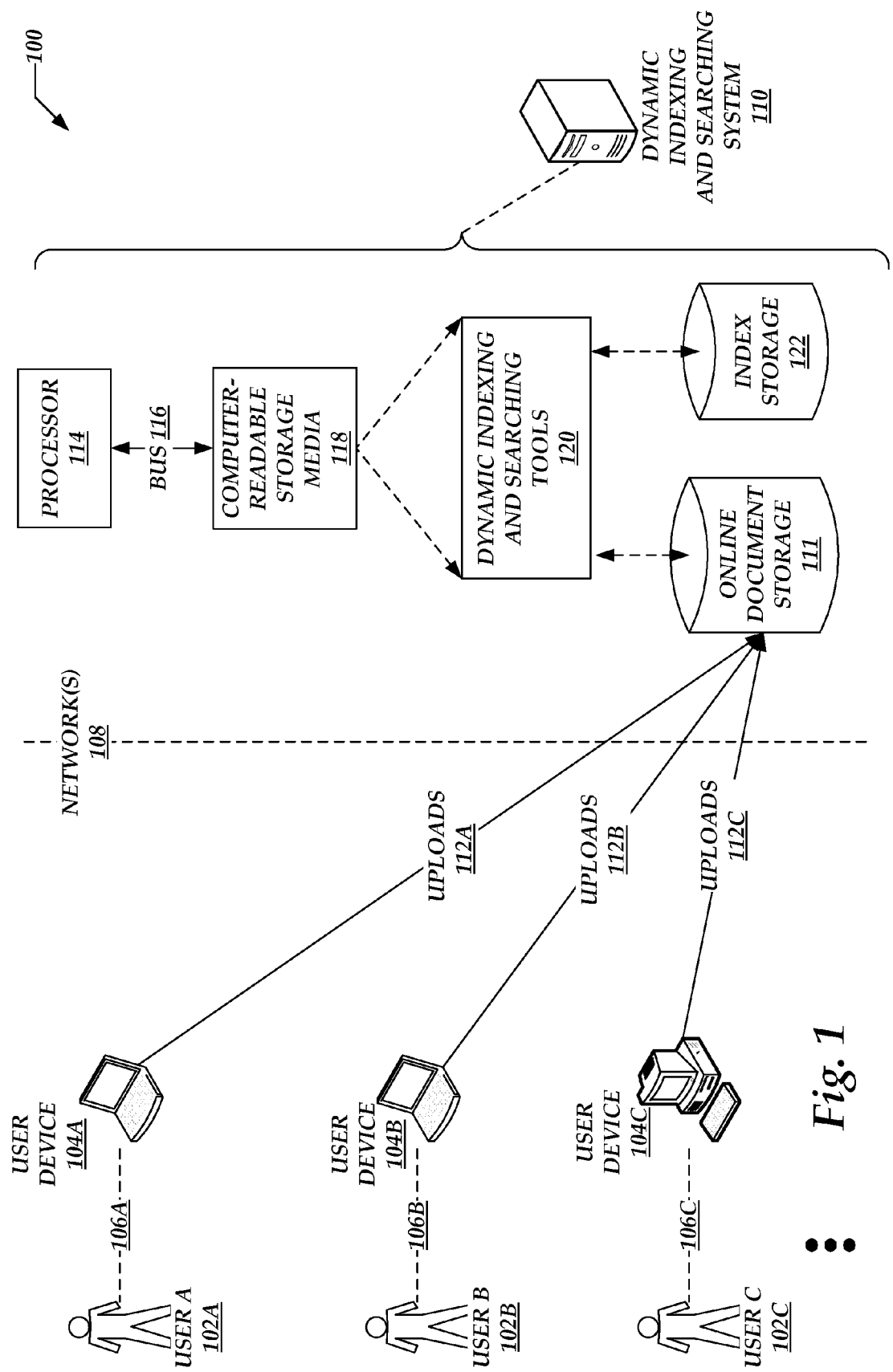
FIG. 1 is a combined block and flow diagram illustrating systems or operating environments suitable for implementing tools and techniques related to indexing and searching dynamically changing search corpora.

The following detailed description provides technologies for indexing and searching dynamically changing search corpora. While the subject matter described herein presents a general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The following detailed description refers to the accompanying drawings that form a part hereof, and that show, by way of illustration, specific example implementations. Referring now to the drawings, in which like numerals represent like elements through the several figures, this description discusses various tools and techniques for indexing and searching dynamically changing search corpora.

FIG. 1 illustrates systems or operating environments, denoted generally at 100, suitable for implementing indexing and searching dynamically changing search corpora. Turning to FIG. 1 in more detail, any number of users 102a, 102b, and 102c (collectively, users 102) may interact with corresponding user devices 104a, 104b, and 104c (collectively, user devices 104). FIG. 1 represents these interactions respectively at 106a, 106b, and 106c (collectively, interactions 106). In general, these interactions 106 may denote commands issued by the users to the devices 104, responses to these commands, and the like, in connection with indexing and searching dynamically changing search corpora.

In connection with the interactions 106, the user devices 104 may communicate over one or more networks 108 with one or more dynamic indexing and search systems 110. More specifically, the users 102, acting through the user devices 104, may upload respective documents 112a-112c (collectively, uploaded documents 112) to an online document storage 111 provided by the indexing and search system 110. Afterwards, indexing processes may retrieve these uploaded documents 112 and index them for subsequent searching. Once the uploaded documents 112 are indexed, the users may perform searches against these uploaded documents 112. The system 110 may provide an online document repository, accessible to any number of user devices 104.

Turning to the networks 108 in more detail, these networks 108 may represent one or more communications networks. For example, the networks 108 may represent local area networks (LANs), wide area networks (WANs), and/or personal area networks (e.g., Bluetooth-type networks), any of which may operate alone or in combination to facilitate indexing and searching dynamically changing search corpora. The networks 108 as shown in FIG. 1 also represents any hardware (e.g., adapters, interfaces, cables, and the like), software, or firmware associated with implementing these networks, and may also represent any protocols by which these networks may operate.

Turning to the indexing and search systems 110 in more detail, these systems 110 as shown in FIG. 1 may represent any number of such systems. The indexing and search systems 110 may cooperate with any number of user devices 104 in connection with indexing and searching dynamically changing search corpora. For example, the indexing and search systems 110 and the user devices 104 may cooperate in a client-server relationship, a peer-to-peer relationship, or any other suitable relationship as appropriate for different implementations.

Turning to the systems 110 in more detail, these systems may include one or more processors 114, which may have a particular type or architecture, chosen as appropriate for particular implementations. The processors 114 may couple to one or more bus systems 116 chosen for compatibility with the processors 114.

The systems 110 may also include one or more instances of computer-readable storage medium or media 118, which couple to the bus systems 116. The bus systems 116 may enable the processors 114 to read code and/or data to/from the computer-readable storage media 118. The media 118 may represent apparatus in the form of storage elements that are implemented using any suitable technology, including but not limited to semiconductors, magnetic materials, optics, or the like. The media 118 may include memory components, whether classified as RAM, ROM, flash, or other types, and may also represent hard disk drives.

The storage media 118 may include one or more modules of instructions that, when loaded into the processor 114 and executed, cause the systems 110 to perform various techniques related to indexing and searching dynamically changing search corpora. As detailed throughout this description, these modules of instructions may also provide various tools or techniques by which the systems 110 may provide the index and search dynamically changing search corpora, using the components, flows, and data structures discussed in more detail throughout this description. For example, the storage media 118 may include one or more software modules that implement dynamic indexing and searching tools 120. These indexing and search searching tools 120 generally represent software programmed or configured to perform various functions allocated herein to the systems 110.

The storage media 118 may also contain one or more instances of the online document storage elements 111 for storing the uploaded documents 112. The storage media may also include index storage elements 122. Subsequent drawings elaborate further on the storage elements 111 and 122. However, in overview, the document storage elements 111 as shown in FIG. 1 generally represent storage locations for data structures representing various documents, permissions levels, sharing specifications, and the like. The index storage elements 122 generally represent storage locations for indexes that facilitate searches of the uploaded documents 112.

Figure 2:
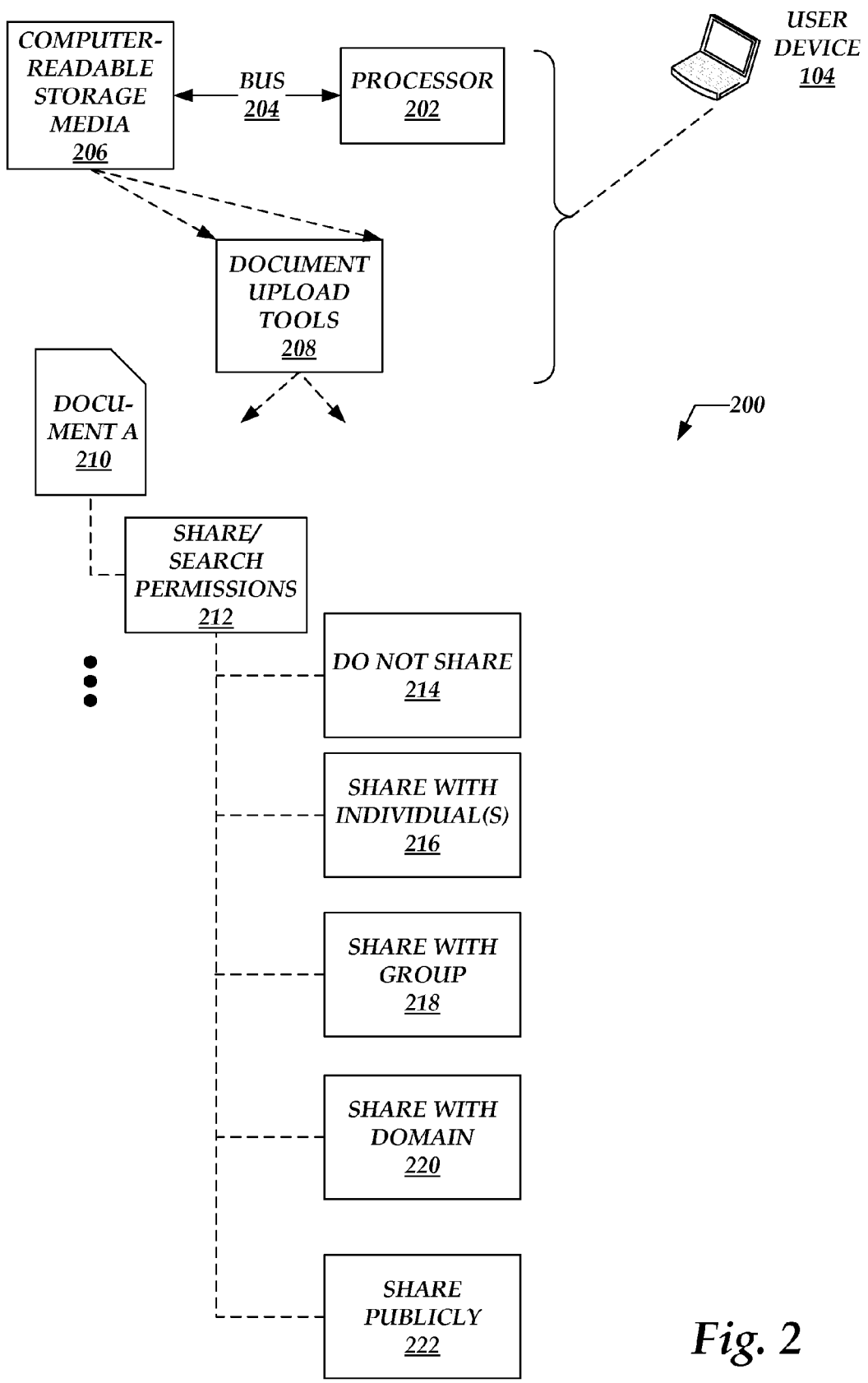
FIG. 2 is a block diagram illustrating examples of share permissions that may be associated with documents.

FIG. 2 illustrates components, denoted generally at 200 of user devices (e.g., 104 in FIG. 1, and carried forward into FIG. 2). FIG. 2 also illustrates examples of share permissions that may be associated with documents in connection with indexing and searching dynamically changing search corpora.

Turning to the user devices 104 in more detail, these devices may include one or more processors 202, which may have a particular type or architecture, chosen as appropriate for particular implementations. The processors 202 in the user devices 104 may or may not be of the same type or architecture as the processors 114 in the indexing and searching systems 110. The processors 202 may couple to one or more bus systems 204 chosen for compatibility with the processors 202. The bus systems 204 in the user devices 104 may or may not be of the same type and architecture as the bus systems 116 chosen for the indexing and searching systems 110.

The user devices 104 may also include one or more instances of computer-readable storage medium or media 206, which couple to the bus systems 204. The bus systems 204 may enable the processors 202 to read code and/or data to/from the computer-readable storage media 206. The media 206 may represent apparatus in the form of storage elements that are implemented using any suitable technology, including but not limited to semiconductors, magnetic materials, optics, or the like. The media 206 may include memory components, whether classified as RAM, ROM, flash, or other types, and may also represent hard disk drives.

The storage media 206 may include one or more modules of instructions that, when loaded into the processor 202 and executed, cause the user devices 104 to perform various techniques related to indexing and searching dynamically changing search corpora. As detailed throughout this description, these modules of instructions may also provide various tools or techniques by which the user devices 104 may index and search across dynamically changing search corpora, using the components, flows, and data structures discussed in more detail throughout this description. For example, the storage media 206 may include one or more software modules that implement document upload tools 208. in general, the document upload tools to await represent software operative to enable the user devices 104 to upload any number of documents 210 across a network (e.g., 108 in FIG. 1) for indexing and storage on suitable indexing and searching systems (e.g., 110 also in FIG. 1).

Figure 3:
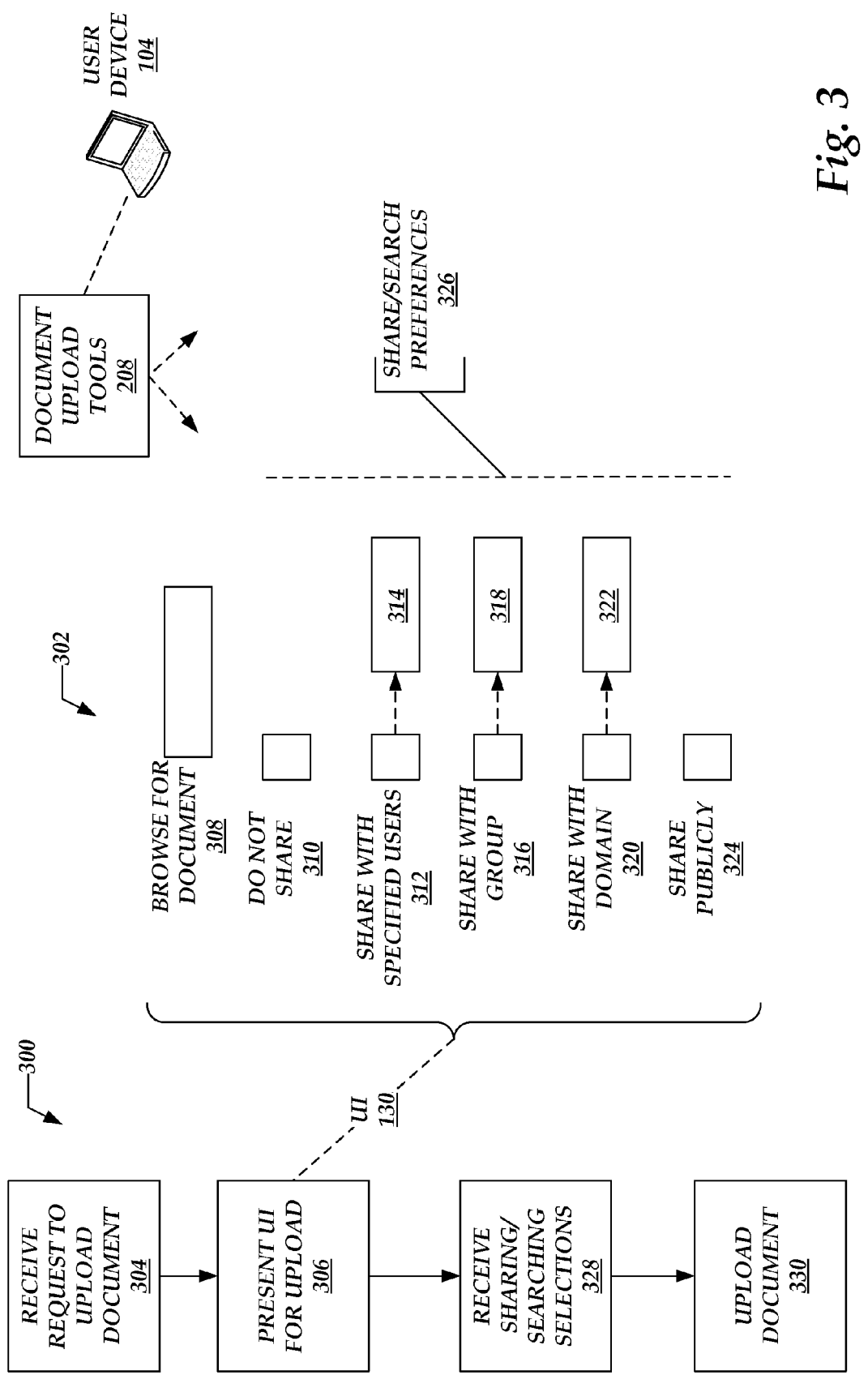
FIG. 3 is a combined block and flow diagram illustrating process flows performed by user devices in connection with indexing and searching dynamically changing search corpora, as well as user interfaces (UIs) by which users may specify the share permissions shown in FIG. 2.

The uploaded documents 210 may be associated with share permissions, denoted generally at 212. The share permissions 212 may be populated using suitable user interfaces that are presented to the users 102. FIG. 3 illustrates examples of these user interfaces, and will be discussed below after concluding the description of FIG. 2.

Turning to the share permissions 212 in more detail, FIG. 2 illustrates several examples of sharing and/or searching permissions that a user may specify when uploading the document 210. For example, as represented generally at 214, the uploading user may specify that a given document 210 is not to be shared with or searchable by any other users. In this manner, the uploading user may maintain at least some of his or her uploaded documents 210 as private.

As represented at 216, the uploading user may identify one or more other individual users who are granted permission to access, edit, and/or search within the uploaded documents. More specifically, the access permissions granted in block 216 may represent permissions granted to specifically identified or enumerated persons, as distinguished from granting permissions to a group or other collective structure in which individual persons may be members.

As represented at 218, the uploading user may identify one or more groups or other collective structures, with these groups or other structures in turn and containing any number of constituents or members. Thus, a given user other than the uploading user may receive access permissions via explicit identification or enumeration in block 216, or may inherit access permissions through membership in a group that receives access in block 218.

As represented at block 220, the uploading user may identify a domain whose members are to receive sharing and/or searching permissions to the uploaded document. Turning to the notion of a "domain" in more detail, in an enterprise context (e.g., a hypothetical company named ABC Inc.), members of a domain may include those users whose e-mail addresses (e.g., john.smith@abc.com) or user logins indicate an affiliation with the enterprise. In some cases, the uploading user may elect to share uploaded documents with some subset of the users associated with the domain. For example, the uploading user may specify sharing permissions limiting the uploaded documents to "emp*@abc.com, such that all users whose email addresses start with "emp" may access the uploaded document. In this manner, the uploading user may enable some or all members of this domain to share and/or search within the uploaded document.

As represented at block 222, the uploading user may also indicate that the uploaded document is freely available for searching and/or sharing by any users of the indexing and searching system 110. In this manner, the uploading user may make the uploaded document "publicly" available to any of these other users.

FIG. 3 illustrates process flows, denoted generally at 300, performed by user devices in connection with indexing and searching dynamically changing search corpora. FIG. 3 also illustrates user interfaces (UIs), denoted generally at 302) by which uploading users may specify the sharing and/or searching permissions to one to shown in FIG. 2.

Turning to FIG. 3 in more detail, the process flows 300 may be understood as elaborating further on processing performed by the document upload tools 208. However, implementations of this description may perform at least portions of the process flows 300 other components without departing from the scope and spirit of this description.

Block 304 represents receiving a request from a given uploading user (e.g., 102 in FIG. 1) to upload one or more documents. FIG. 2 provides examples of such documents at 210.

Block 306 represents providing a suitable user interface (UI) to the uploading user in response to the request received in block 304. For example, block 306 may include presenting the UI 302. Turning to the UI 302 in more detail, it may include a document selection device 308 for selecting the file to be uploaded. For example, the document selection device 308 may enable the user to directly key in a path and name associated with the uploaded document, or may enable the user to browse to and select the uploaded document within a directory structure.

The UI 302 may include a device 310 that is responsive to user input or activation to indicate that the uploaded document is to be kept private to the uploading user. In different possible implementations, the device 310 may be presented to the uploading user when the user is uploading the document, or may be presented to the uploading user after the user has uploaded the document. For example, by activating the device 310, the uploading user may specify that the uploaded document is not to be shared with or searchable by any other users, once the uploaded document is stored on the indexing and searching system 110.

The UI 302 may include a device 312 that is responsive to user input or activation to indicate that the uploaded document may be shared with one or more specifically enumerated or identified other users on the indexing and searching system 110. For example, the uploading user may check or otherwise activate the device 312, and may then enter information into a field 314 that specifically identifies the other users who are granted access to the uploaded document. Information entered into the field 314 may include e-mail addresses, unique user identifiers issued by the indexing and searching system 110, or other suitable identifying information. In some scenarios, the uploading user may select the field 314 and enter characters into that field. As the user enters characters into the field 314, the document upload tools 208 may filter and update a list of other users whose identifiers match the entered characters.

The UI 302 may include a device 316 that is responsive to user input or activation to indicate that one or more groups of other users may share and/or search within the uploaded document. For example, the uploading user may check or otherwise activate the device 316, and may then enter information into a field 318 that identifies the group or groups of other users that may access the uploaded document. Similar to the above description of the field 314, the field 318 may be responsive to characters entered into this field, such that the field 318 presents a filtered list of predefined groups that match the entered characters.

A device 320 is responsive to user input or activation to indicate that the uploaded document may be shared with or searchable by users who are associated with one or more given domains. For example, the uploading user may check or otherwise activate the device 320, and may enter information into a field 322 and identifies the domains with which the uploaded document is to be shared. As above with the fields 314 and 318, the field 322 may also provide a filtering function for presenting illegible domains, based on any characters entered into the field 322.

A device 324 is responsive to user input or activation to indicate that the uploaded document is to be shared with or searchable by any users who have legitimate access to the indexing and searching system 110. In this manner, the uploading user may make a given uploaded document publicly accessible and searchable across the indexing and searching system 110 by activating the device 324.

FIG. 3 collectively represents the devices 310-324 as sharing or searching preferences 326, as expressed by the uploading user for a given uploaded document. It is noted that for a given uploaded document, one or more of the references 326 may be activated, as appropriate in different contexts. For example, if the device 310 is activated to maintain a given uploaded document as private, the remaining devices 312-324 may be deactivated (e.g., grayed-out and unresponsive to user selection). Likewise, if the device 324 is activated to publicly share a given uploaded document without restrictions, the devices 310-322 may be deactivated.

Regarding the devices 312-322, the user may activate one or more of these devices, depending on how the user wishes to manage a given uploaded document. For example, the user may wish to share of the uploaded document with two different specifically-named users, and may do so by activating the device 312 and identifying the named users in the field 314. In addition to these two specifically-named users, the user may share the uploaded document with one or more groups of users by activating the device 316 and identifying the desired groups in the field 318. The two specifically-named users identified in the field 314 may or may not be members of the groups identified in the field 318. Similarly, the uploaded document may be shared with users associated with a particular domain by activating the device 320 and populating the field 322. In general, users may activate or deactivate the devices 312, 316, and 320 together or separately as appropriate for particular uploaded documents.

Returning to the process flows 300, block 328 represents receiving the sharing/searching parameters 326, as selected and entered by the user through the various tools provided by the UI 302. In turn, block 330 represents uploading the document to the indexing and searching system 110. The uploaded document may be associated with the sharing/searching references 326, so that the indexing and searching system 110 may index the uploaded document appropriately for later search.

Figure 4:
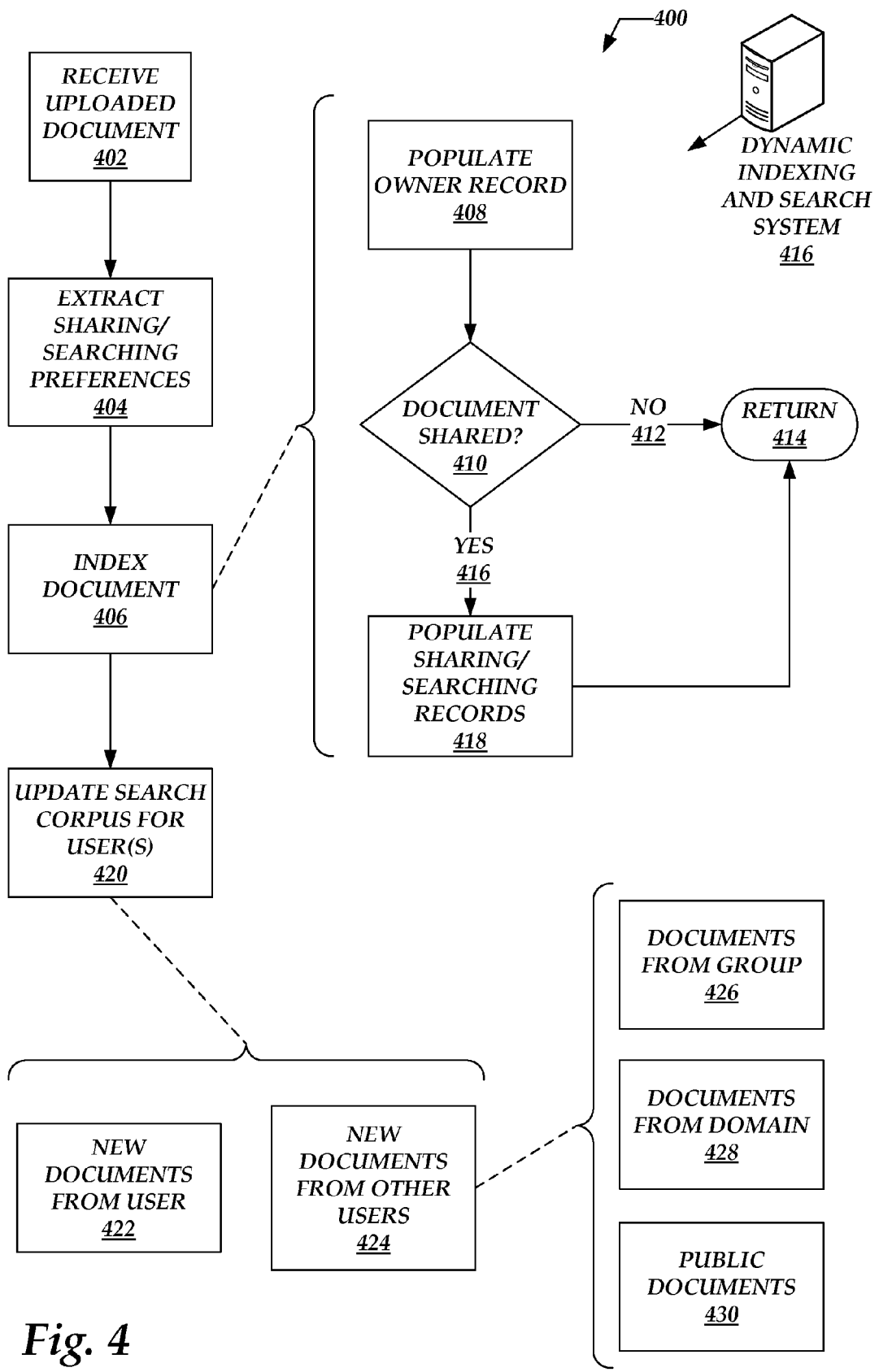
FIG. 4 is a flow diagram illustrating process flows related to indexing and searching dynamically changing search corpora, as performed by a dynamic indexing and search system.

FIG. 4 illustrates process flows, denoted generally at 400, related to indexing and searching dynamically changing search corpora, as performed by the dynamic indexing and searching system 110. More specifically, the process flows 400 may be understood as elaborating further on the dynamic indexing and searching tools 120 as shown in FIG. 1. However, although the process flows 400 are described in connection with the dynamic indexing and searching system 110, implementations of this description may perform at least portions of these process flows 400 with other components without departing from the scope and spirit of this description.

Turning to the process flows 400 in more detail, block 402 represents receiving a given uploaded document. For example, continuing the scenarios discussed with the previous Figures, block 402 may represent receiving the document 210 shown in FIG. 2. In addition, block 402 may include receiving the uploaded document over one or more intermediate networks (e.g., 108 in FIG. 1).

Block 404 represents extracting any applicable sharing/searching preferences specified for the uploaded document. Examples of the sharing/searching preferences are shown in FIG. 3 at 326, as may be defined using the UI devices 310-324.

Block 406 represents indexing the uploaded document as appropriate for supporting subsequent searching. For example, block 406 may include processing the content of the uploaded document and building a search index for the uploaded document. The search index may include keywords found within the uploaded document, and may indicate where these keywords occur within the uploaded document. Accordingly, if a given incoming search requests occurrences of these keywords, the search index may efficiently return any locations of these keywords as found within the uploaded document, and may also return the document itself.

In addition, block 406 may include populating an owner record associated with the uploaded document, as represented generally at block 408. As used herein, the "owner" of a document refers to a user who uploads the document to the indexing and searching system 110. In general, the owner of the uploaded document specifies the sharing/searching preferences 326 associated with that uploaded document.

Block 406 may also include analyzing the sharing/searching preferences as extracted in block 404, to determine whether the uploaded document is to be shared or searchable by users other than the owner of the document. FIG. 4 generally represents this analysis at decision block 410. For example, block 410 may include referring to the sharing/searching preferences 326 or the uploaded document, to determine whether the owner activated the device 310 when uploading the document.

From decision block 410, if the uploaded document is not to be shared or searchable by any users other than the owner, the process flows 400 may take No branch 412 to return to block 406 (represented generally at 414). However, returning to decision block 410, if the uploaded document is to be shared or searchable by at least one user other than the owner, the process flows 400 may take Yes branch 416 to block 418. Block 418 represents populating records maintained internally by the indexing and searching system 110 to indicate which other users may search the uploaded document. In addition, other process flows may further populate these records to indicate which other users may view or edit the uploaded document. Afterwards, the process flows 400 may return to block 406 via block 414.

After completing block 406, the process flows 400 may proceed to block 420, which represents updating one or more search corpora in response to the sharing/searching preferences associated with the uploaded document. For example, as represented at 422, if an owner provides a new uploaded document, a search corpus associated with the owner may include at least the new uploaded document. In addition, if the owner has identified at least one other user may access the uploaded document, the search corpus for the other user may also be updated to include at least the uploaded document.

In other scenarios, from the perspective of the owner, one or more other users may permit the owner to access documents uploaded by those other users. Accordingly, block 424 represents updating the search corpus of the owner to incorporate or include documents uploaded by other users, in cases where those other users explicitly or implicitly permit the owner to access such documents.

Examples of permissions explicitly granted to the owner may include scenarios in which the other users specifically identify the owner as having access to documents uploaded by those other users. Examples of permissions implicitly granted to the owner may include scenarios in which the owner is a member of a group specified by the other users, as represented generally at block 426. In such scenarios, the owner may inherit access rights through membership in the group specified by such other users.

As another example of implicitly granted permissions, block 428 represents the owner receiving sharing or searching rights to a given uploaded document through association with a domain. For example, other users may upload the given document, and may specify that all members of the domain may access the uploaded document. In addition, block 430 represents the owner receiving sharing or searching rights to a given uploaded document in cases where the owner of that document makes the document publicly available.

Figure 5:
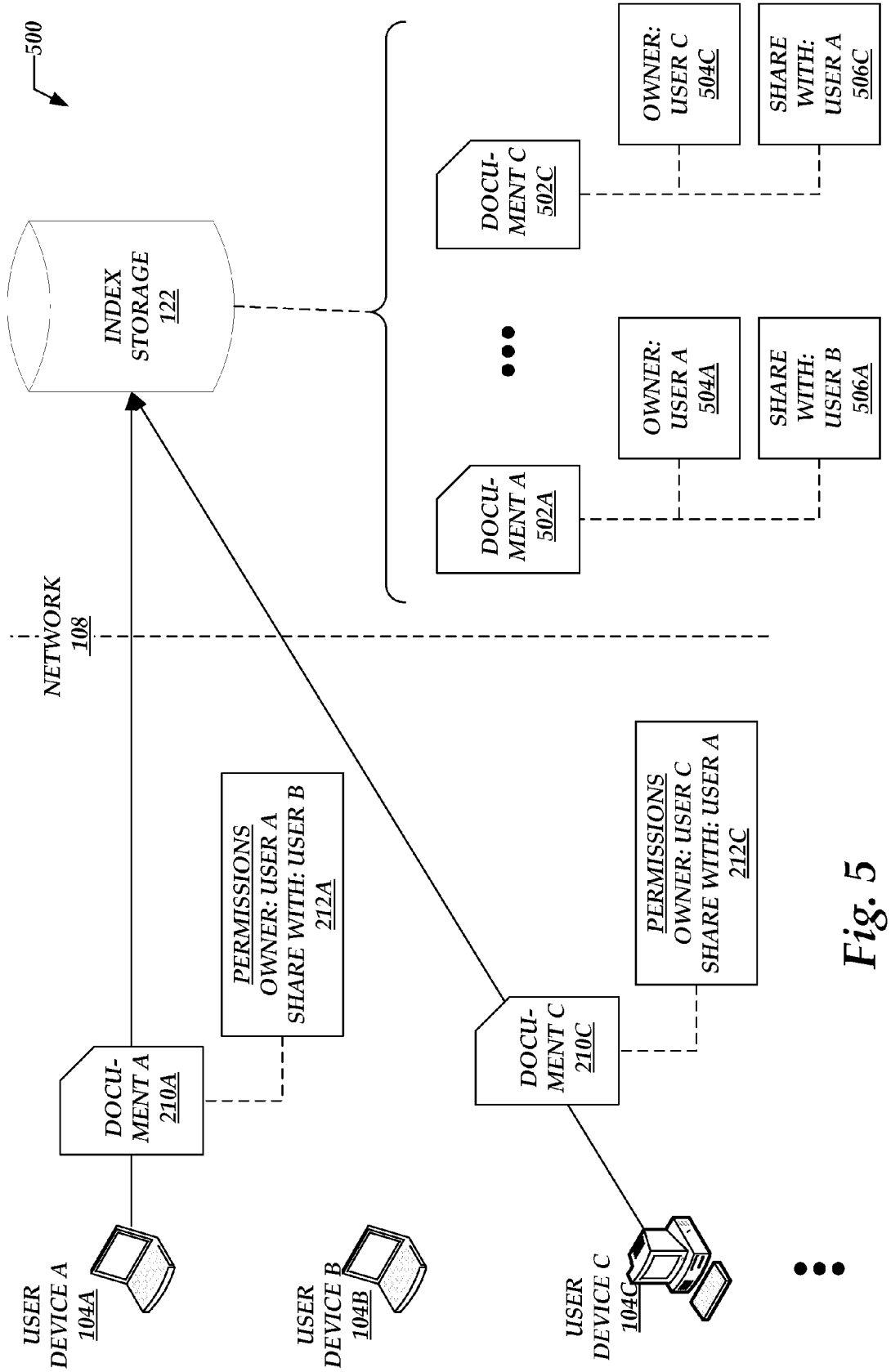
FIG. 5 is a combined block and flow diagram illustrating document flows from the user devices over a network to a document and index storage element.

FIG. 5 illustrates components and document flows, denoted generally at 500, in which user devices upload documents over a network to online document and index storage elements. Turning to FIG. 5 in more detail, this Figure carries forward examples of the user devices at 104*a*, 104*b*, and 104*c*. FIG. 5 also carries forward a representative network at 108, representative uploaded documents at 210*a* and 210*c*, and a representative online document storage element at 122.

In the example scenario shown in FIG. 5, the user device 104*a* uploads the document 210*a* over the network 108. The uploaded document 210*a* may be associated with a corresponding set of permissions, carried forward at 212*a*. The permissions 212a may identify the owner of the uploaded document, and may also indicate which other users (if any) are permitted to share or search within the uploaded document. As shown, the permissions 212a indicate that the user 102a (as shown in FIG. 1) owns the uploaded document 210a, and that the user 102a has allowed only the user 102b to share or search this uploaded document.

In the other example shown in FIG. 5, the user device 104c is shown uploading the document 210c, with this document associated with corresponding permissions 212c. As shown, the permissions 212c indicate that the user 102c (as shown in FIG. 1) owns the uploaded document 210c, and that the user 102c has allowed only the user 102a to share or search this uploaded document.

When the uploaded documents 210a and 210c arrive at the indexing and searching system 110, this system 110 may process the uploaded documents 210 into the online document and index storage elements 122. As shown in FIG. 5, the storage elements 122 may include representations 502a and 502c (collectively, document representations 502) corresponding respectively to the uploaded documents 210a and 210c.

Turning to the document representation 502a, the storage elements 122 may associate representations 504a and 506a therewith. More specifically, the representation 504a may indicate that the owner of the uploaded document 210a is the user 102a, while the representation 506a may indicate that the user 102a has granted the user 102b permission to share/search the uploaded document 210a.

Similarly, turning to the document representation 502c, the storage elements 122 may associate representations 504c and 506c therewith. The representation 504c may indicate that the owner of the uploaded document 210c is the user 102c, while the representation 506c may indicate that the user 102c has permitted the user 102a to share/search the uploaded document 210c.

Figure 6:
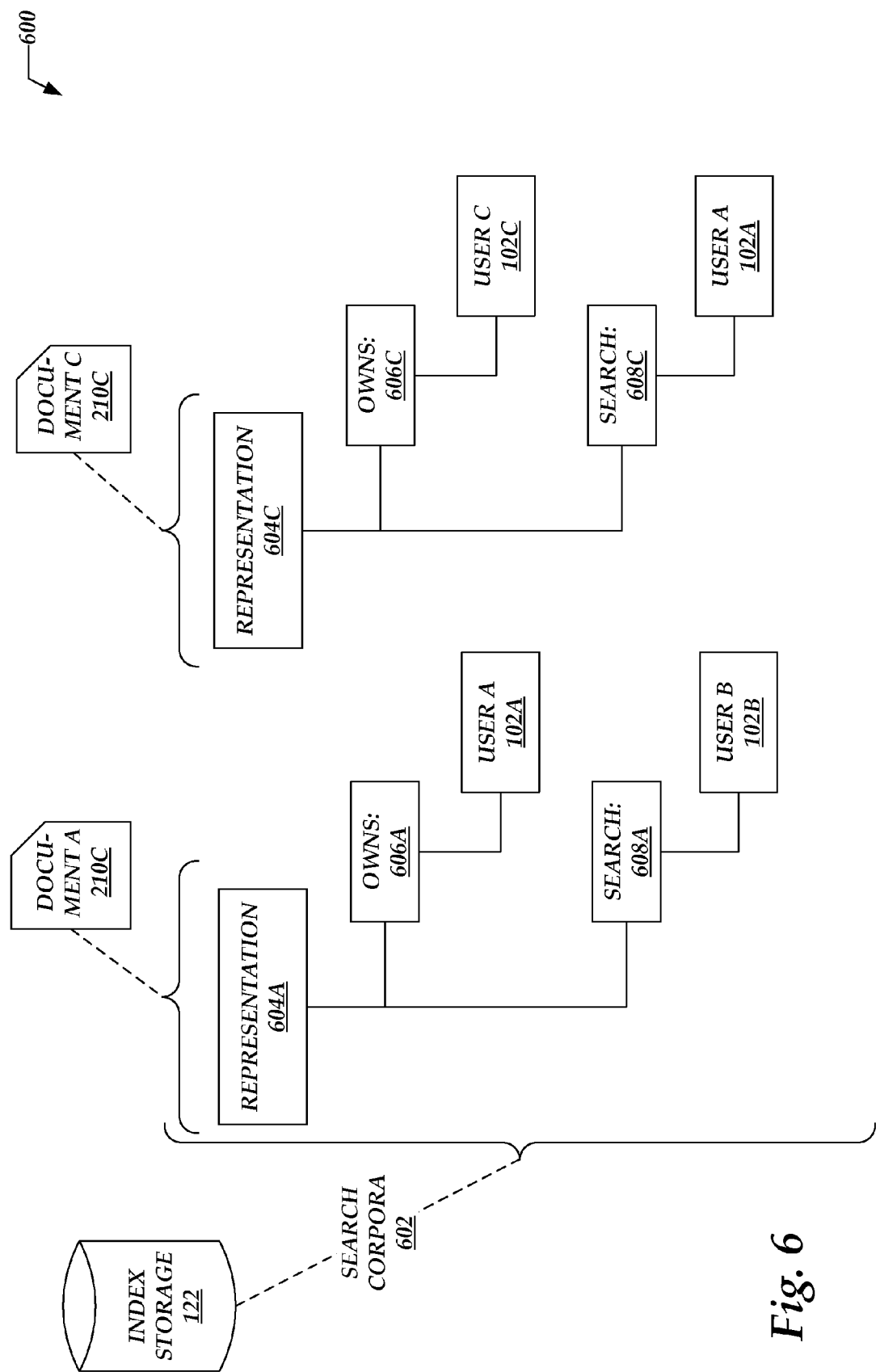
FIG. 6 is a block diagram providing further details related to the document and index storage element, illustrating different search corpora as associated with different users.

Turning now to FIG. 6, this Figure illustrates further details, denoted generally at 600, related to the online document and index storage elements 122. In addition, FIG. 6, illustrates different search corpora as associated with different users.

Turning to FIG. 6 in more detail, as new uploaded documents arrive at the indexing and searching system 110, as uploaded documents are removed, deleted, or modified, or as sharing permissions of existing uploaded documents are changed over time, the system 110 may update the online document and index storage elements 122. More specifically, as any of the foregoing events occur over time, the storage elements 122 may dynamically define, maintain, and update representations of search corpora that are associated with different users.

FIG. 6 collectively represents at 602 search corpora maintained for a plurality of different users. Turning to the index storage elements 122 in more detail, these elements 122 may include representations of different documents (e.g., 210a and 210c). In the example shown, a representation 604a corresponds to the document 210 and a representation 604c corresponds to the document 210c, with the users 102a-102c omitted from FIG. 6 in the interest of clarity.

In turn, the document representations 604a-604c (collectively, document representations 604) may indicate which users own and may share or search the documents. In the example shown, the document representation 604a is associated with an ownership record 606a, which indicates that the user 102a owns the uploaded document 210a. However, in implementations of this description, a given user may own any number of uploaded documents.

In addition, the document representation 604a is associated with a search record 608a, which indicates that the owner of the document 210a has permitted at least the user 102b to share or search within the document 210a. Recalling previous description of this example, the user 102a uploaded the document 210a, with permissions information allowing the user 102c to access the uploaded document 210a. However, in implementations of this description, a given user may have permissions to access a number of uploaded documents. In addition, in such implementations, examples of permissions may extend beyond the searching or sharing permissions illustrated in FIG. 6.

Turning to the document representation 604c, in the example shown in FIG. 6, an ownership record 606c may indicate that the user 102c uploaded and owns the document 210c. In addition, a search record 608c may indicate that the user 102c has shared the document 210c with at least the user 102a, permitting at least the user 102a to search the document 210c.

Figure 7:
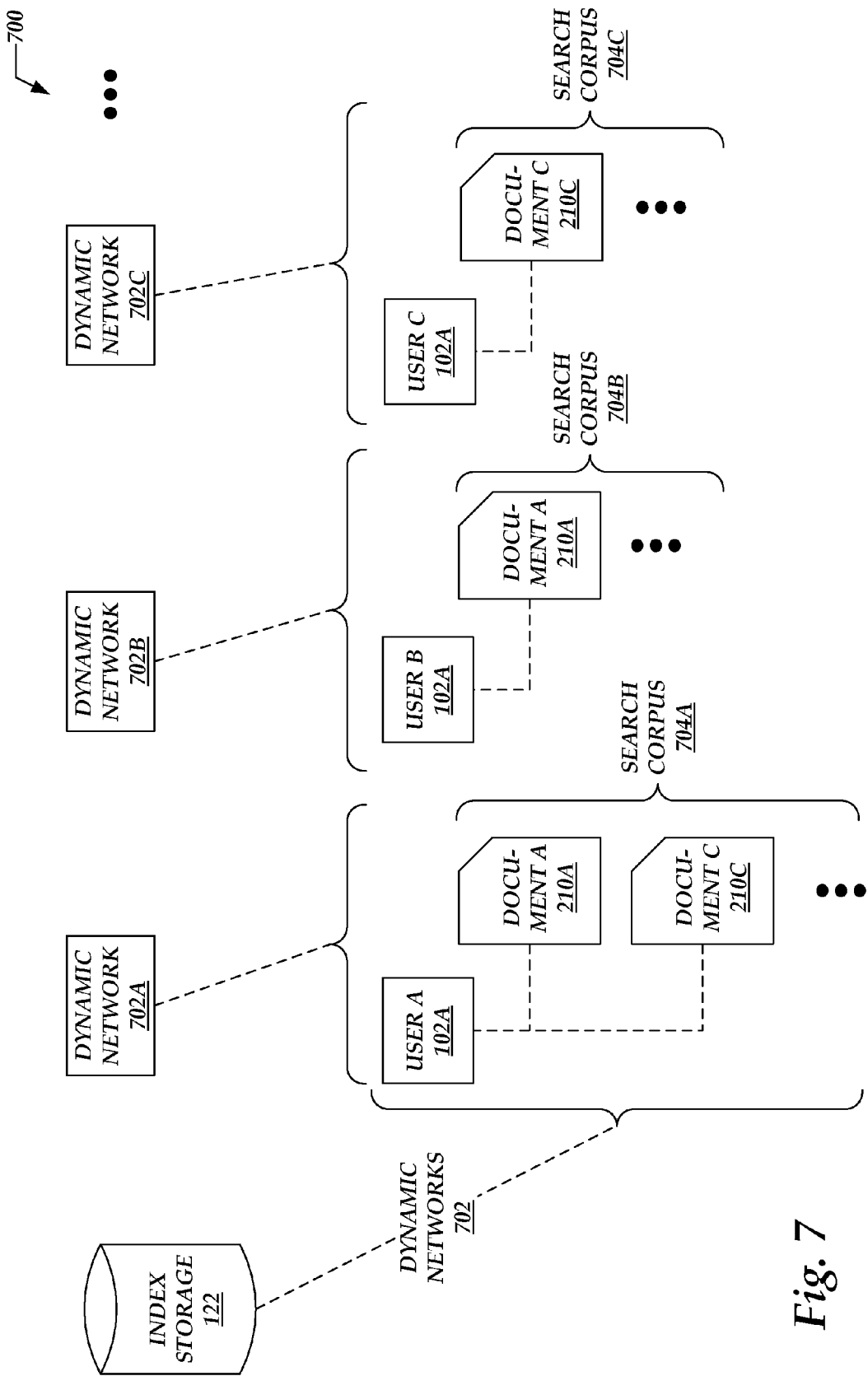
FIG. 7 is a block diagram providing further details related to the document and index storage element, illustrating different dynamic networks and folders associated with particular documents.

FIG. 7 illustrates further details, denoted generally at 700, related to the storage elements 122. More specifically, FIG. 7 illustrates different dynamic networks and folders associated with particular uploaded documents 210.

Turning to FIG. 7 in more detail, dynamic networks as maintained for different uploaded documents are represented collectively at 702. In the snapshot shown in FIG. 7, the index storage element 122 defines and maintains a dynamic network 702a that is associated with the user 102a, a dynamic network 702b that is associated with the user 102b, and a dynamic network 702c that is associated with the user 102c.

In general, these dynamic networks 702 may indicate, for given users, those documents in which those users are allowed to search, whether by owning those documents or by sharing permissions granted by the owners of those documents. As described elsewhere herein, these dynamic networks are "dynamic" in the sense that their scope may change over time as new documents are added or deleted, or as owners of these documents alter the permissions settings of those documents.

Turning to the dynamic network 702a, which corresponds to the user 102a, this dynamic network 702a may indicate that the user 102a has access and is permitted to search at least the document 210a (through ownership) and the document 210c (through permission granted by the owning user 102c). Thus, in the snapshot shown in FIG. 7, the dynamic network 702a associated with the document 210a includes the users 102a and 102b. Further, a dynamic search corpus 704a of documents in which the user 102a may search includes the documents.

Likewise, turning to the dynamic network 702b, which corresponds to the user 102b, this dynamic network 702b may indicate that the user 102b does not own any documents. However, in the example shown in FIG. 7, the user 102a has granted the user 102b permission to search within the document 210a. Accordingly, in the snapshot shown in FIG. 7, the dynamic network 702b associated with the user 102b may include the user 102a. Further, a dynamic search corpus 704b associated with the user 102b may include the document 210a.

Finally, a dynamic network 702c associated with the user 102c may indicate that the user 102c owns the document 210c. Accordingly, in the snapshot shown in FIG. 7, the dynamic network 702c associated with the user 102c may include the users 102c and 102a. Further, a dynamic search corpus 704c associated with the user 102c may include the document 210c.

As described above, the search corpus 704*a* that is associated with the user 102*a* may indicate that the user 102*a* may search within the document 210*a* (owned by the user 102*a*) and within the document 210*c* (permissions granted by the user 102*c*). However, as described in further detail below, the user 102*a* may or may not search across his or her entire permitted search corpus for a given search. Thus, the search corpus 704*a* indicates a maximum scope of documents in which the user 102*a* is permitted to search at any given time.

As discussed throughout this description, the extent and scope of the search corpus 704*a* may dynamically vary over time, as documents 210 are added to or deleted from the document storage 111 and the index storage 122. In addition, the owners of these documents 210 may adjust or modify the permissions set for their documents 210. Any of the foregoing events, and possibly other events, may have a type of ripple effect on the search corpora 704 for different users 102.

Similarly, in the example snapshot shown in FIG. 7, the user 102*b* has not uploaded any documents. However, the search corpus 704*b* indicates that the user 102*b* has been granted permission to access the document 210*a*, should be user 102*b* so choose for a given search. In addition, the search corpus 704*b* may also change dynamically, depending on actions taken by the user 102*b* or other users 102.

Similar considerations apply to the dynamic search corpus 704*c* maintained for the user 102*c*. In the snapshot shown in FIG. 7, the search corpus 704*c* indicates that the user 102*c* a search within the document 210*c* (through ownership). However, the search corpus 704*c* may indicate that the user 102*c* has not been granted permission to access any other uploaded documents.

The foregoing drawing FIGS. 1-7 describe various techniques related to uploading documents from the user devices, and processing these uploaded documents into the document and index storage elements 122. Beginning with FIG. 8, this description begins discussing techniques related to searching these uploaded documents as processed into the document and index storage elements 122.

Figure 8:
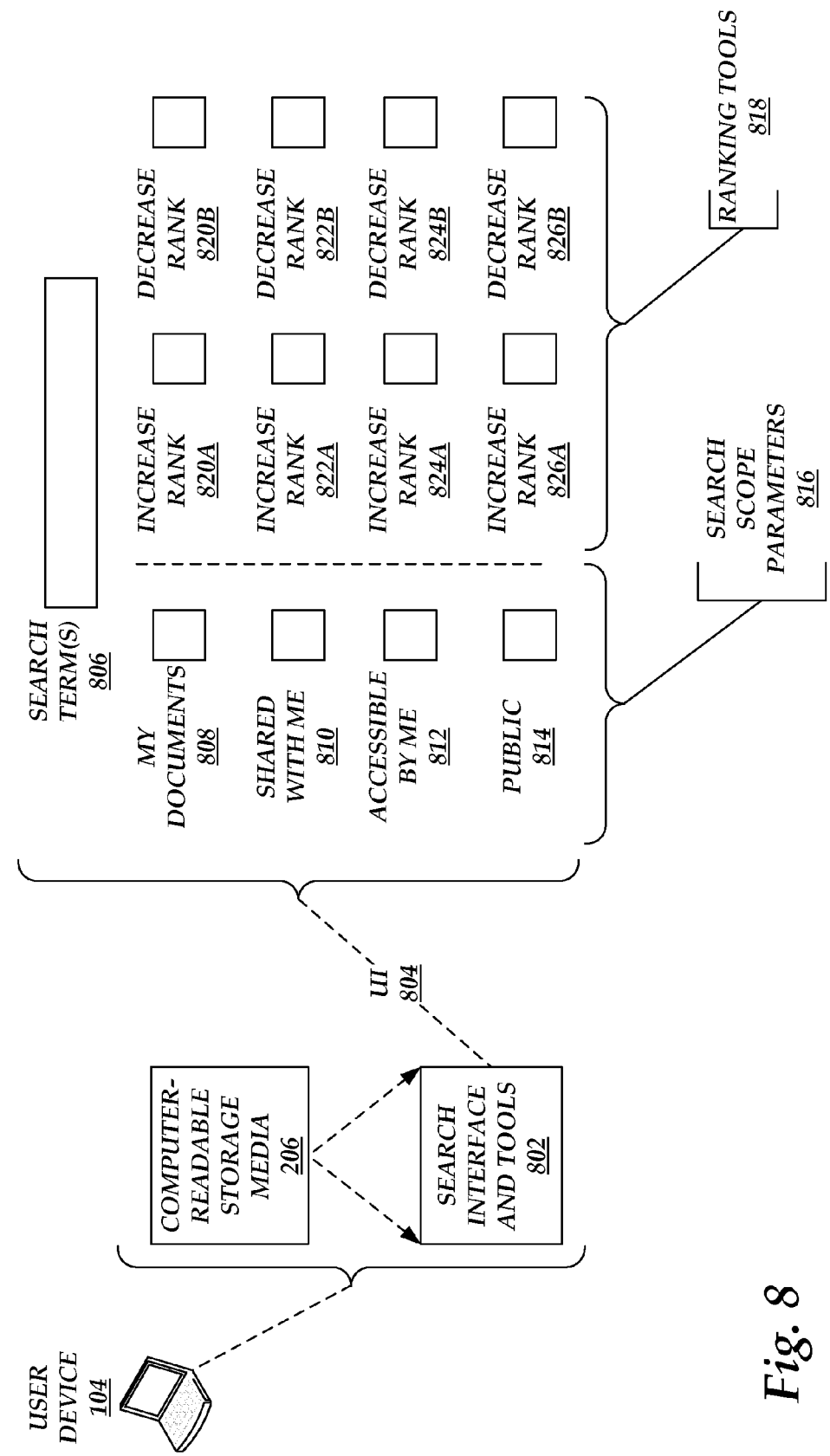
FIG. 8 is a block diagram illustrating search interfaces and tools provided by the user devices, as well as illustrating example UIs by which users may define search scope parameters for a given search.

FIG. 8 illustrates search interfaces and tools, denoted generally at 800, as provided by the user devices, as well as illustrating example UIs by which users may define search scope parameters for a given search. For ease of illustration, FIG. 8 carries forward a representative user device at 104, which may contain a representative computer-readable storage medium, carried forward for convenience at 206. As shown in FIG. 8, the storage media 206 may include software modules that provide a search interface and related tools 802.

Turning to the search interface and tools 802 in more detail, these tools 802 may provide a UI 804 in response to a user request to initiate a search of uploaded documents. As shown in FIG. 8, the UI 804 may include a field 806 into which the user may enter one or more keywords or other terms to locate in the uploaded documents.

The UI 804 may include a device 808 that is responsive to user input or activation to indicate that a given user wishes to search for the keywords only in documents that he or she has uploaded. Put differently, if the device 808 is activated, the search performed on the indexing and searching system 110 would include only those documents owned by the given user.

The UI 804 may also include a device 810 that is responsive to user input or activation to indicate that the given user wishes to search for the keywords only in documents uploaded by other users that have granted the given user access to those uploaded documents. Put differently, if the device 810 is activated, the search performed on the indexing and searching system 110 would include only documents not owned by the given user, but to which the user has been granted access.

A device 812 is responsive to user input or activation to indicate that the given user wishes to search for keywords in documents that he or she has uploaded and owns, in addition to a documents to which the given user has been granted access. Put differently, the search results generated by activating the device 812 may be equivalent to the result set would be generated by checking both the devices 808 and 810.

Finally, a device 814 is responsive to user input or activation to indicate that the given user wishes to search for keywords in uploaded documents that are "publicly" accessible to all users. Put differently, activating the device 814 results in searching all documents whose permissions are set to "public", without regard to who owns the documents or who has been granted access to the documents.

It is noted that the devices 808-814 may be selected as appropriate for different given searches to define the scope for those searches. In this context, the term "scope" refers to the corpus of uploaded documents against which a given search is to be executed. Taken collectively, the devices 808-814 may be characterized as selection devices for defining search scope. This defined search scope may be expressed as search scope parameters 816. These scope selection devices may be activated individually or in combination to define desired scope for different given searches. For example, by activating (e.g., checking) the devices 808 and 814, a given user may run a search against those documents that the given user owns and against those documents that other users have made publicly available. As another example, by activating the devices 812 and 814, the given user to run a search against those documents accessible to the given user (whether by direct ownership or by permission granted by another owner).

In some implementations of the UI 804, this UI may include ranking tools, as denoted generally at 818. In overview, these ranking tools 818 may enable a user to specify how search results are to be ranked relative to one another, depending on the type of uploaded documents in which the search results are located. For example, assuming that a given user has uploaded his or her own documents, and thereafter performs a given search, a user may wish to have search results occurring in his or her own documents appear first in the search results, followed by any other hits occurring in non-owned uploaded documents.

Turning to the ranking tools 818 in more detail, these ranking tools may cooperate with any activated or selected devices 808-814 to rank search results corresponding to those activated devices relative to one another. For example, ranking tools 820*a* and 820*b* (collectively, ranking tools 820) may be associated with the UI device 808, and ranking tools 822*a* and 822*b* (collectively, ranking tools 822) may be associated with the UI device 810. Similarly, ranking tools 824*a* and 824*b* (collectively, ranking tools 824) may be associated with the UI device 812, and ranking tools 826*a* and 826*b* (collectively, ranking tools 826) may be associated with the UI device 814.

In operation, assuming that a given user activates or selects the UI device 808, such that hits occurring within the given user's own documents appear in the search results, the ranking tools 820 may enable the given user to specify where these hits are presented in the search results, relative to hits occurring in other types of uploaded documents. For example, the given user may activate the ranking tool 820*a* to increase the relative rank of these hits in the search results, and may activate the ranking tools 820*b* to decrease the relative rank of these hits. The user may activate the ranking tools 820 repetitively as appropriate until reaching the desired ranking.

In example implementations, the ranking tools 820a-826a may be "up" arrows, and the ranking tools 820b-826b may be "down" arrows. In some scenarios, the ranking tools 820-826 may be "grayed out" or deactivated, until the corresponding UI devices 808-814 are activated. In addition, the UI 804 may respond to manipulation of the ranking tools 820-826 to adjust the order in which the devices 808-814 are presented. Put differently, the order in which the devices 808-814 appear in the UI 804 may reflect the ranking of search results specified by the user through the ranking tools 818.

Figure 9:
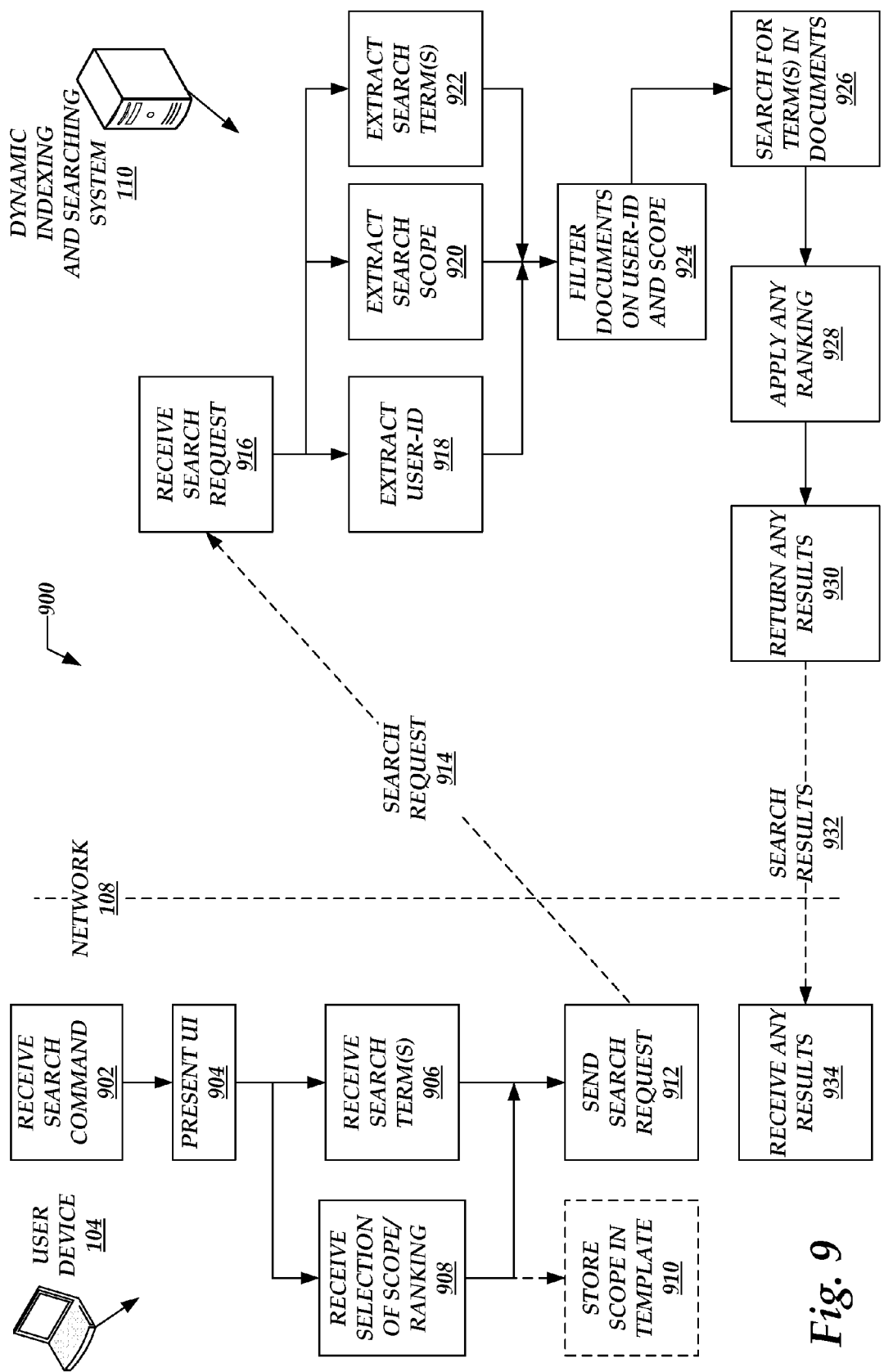
FIG. 9 is a flow diagram illustrating process flows by which the user devices and the dynamic indexing and search systems may cooperate in connection with searching dynamically changing search corpora.

FIG. 9 illustrates process flows, denoted generally at 900, by which the user devices 104 and the dynamic indexing and searching systems 110 may cooperate in connection with searching dynamically changing search corpora. As shown in previous drawings, the user devices 104 and searching systems 110 may communicate over one or more suitable networks 108.

Turning first to the user devices 104, the process flows 900 may begin at block 902, which represents receiving a search command or request from a user as provided to the user device 104. In turn, block 904 represents presenting a suitable UI to the user in response to the search command received in block 902. FIG. 8 provides an example of such a UI, denoted generally at 804.

Block 906 represents receiving one or more keywords or other search terms as entered into the UI presented in block 904. For example, this UI may include a field such as that shown at 806 in FIG. 8 into which the user may enter desired keywords.

Block 908 represents receiving a selection of search scope as provided by the user. For example, the UI presented in block 904 may include devices such as those shown at 808-814 in FIG. 8. In this manner, the user may indicate whether he or she wishes to search: only his or her own uploaded documents; documents uploaded by other users who have granted the user access to those documents, or who have uploaded these documents and made them publicly accessible; or any combination of the foregoing scenarios.

Block 908 may also include receiving specified rankings applicable to the search results. For example, block 908 may include receiving input from the ranking tools 818 as illustrated in FIG. 8 and discussed above.

In some implementation scenarios, the process flows 800 may include block 910, which represents storing the search terms, scope definitions, and ranking specifications in a template for later retrieval. For example, in cases in which a given user repetitively performs the same searches, it may be more efficient to retrieve the search parameters from a template rather than having the user reenter the same parameters for each repeated search.

Block 912 represents sending the search request from the user device 104 over the network 102 to the dynamic indexing and searching system 110. FIG. 9 represents the search request at 914 as transmitted from the user device 104. In general, the search request 914 may include an identification of the user submitting the request, keywords or other search terms, an indication of search scope, and in some cases, an indication of preferred or ranking of results.

Referring now to the dynamic indexing and searching system 110, block 916 represents receiving the search request 914. In turn, the system 110 may extract the user identification (i.e., user ID) from the search request 914, as represented by block 918. In addition, the system 110 may extract search scope parameters from the search request 914, as represented by block 920. Block 922 represents extracting the keywords or other search terms specified in the search request 914.

Block 924 represents filtering documents uploaded to the indexing and searching system 110, based upon the user ID and search scope as extracted in blocks 918 and 920. To expedite this filtering process, block 924 may include referring to a search corpus associated with different users or user IDs. For example, referring briefly back to FIG. 6, the system 110 may include the online document and index storage 122. In turn, the storage elements 122 may associate respective search corpora 602 with different users.

Returning to FIG. 9, at search time, when one of these users submits a search request, block 924 may include locating the search corpus for the appropriate user. In turn, block 926 represents searching for the specified keywords within the documents contained within the appropriate search corpus for that user. In addition, block 928 may include ranking any search results, in cases where search requests specify ranking preferences.

Block 930 represents returning any search results located within the uploaded documents that are responsive to the search request 914. FIG. 9 generally represents these search results at 932.

At the user device 104, block 934 represents receiving the search results 932. In turn, the user device 104 may format and present the search results. In cases where the search request 914 specified ranking preferences, the user device 104 may incorporate these ranking preferences when displaying the search results 932.

Figure 10:
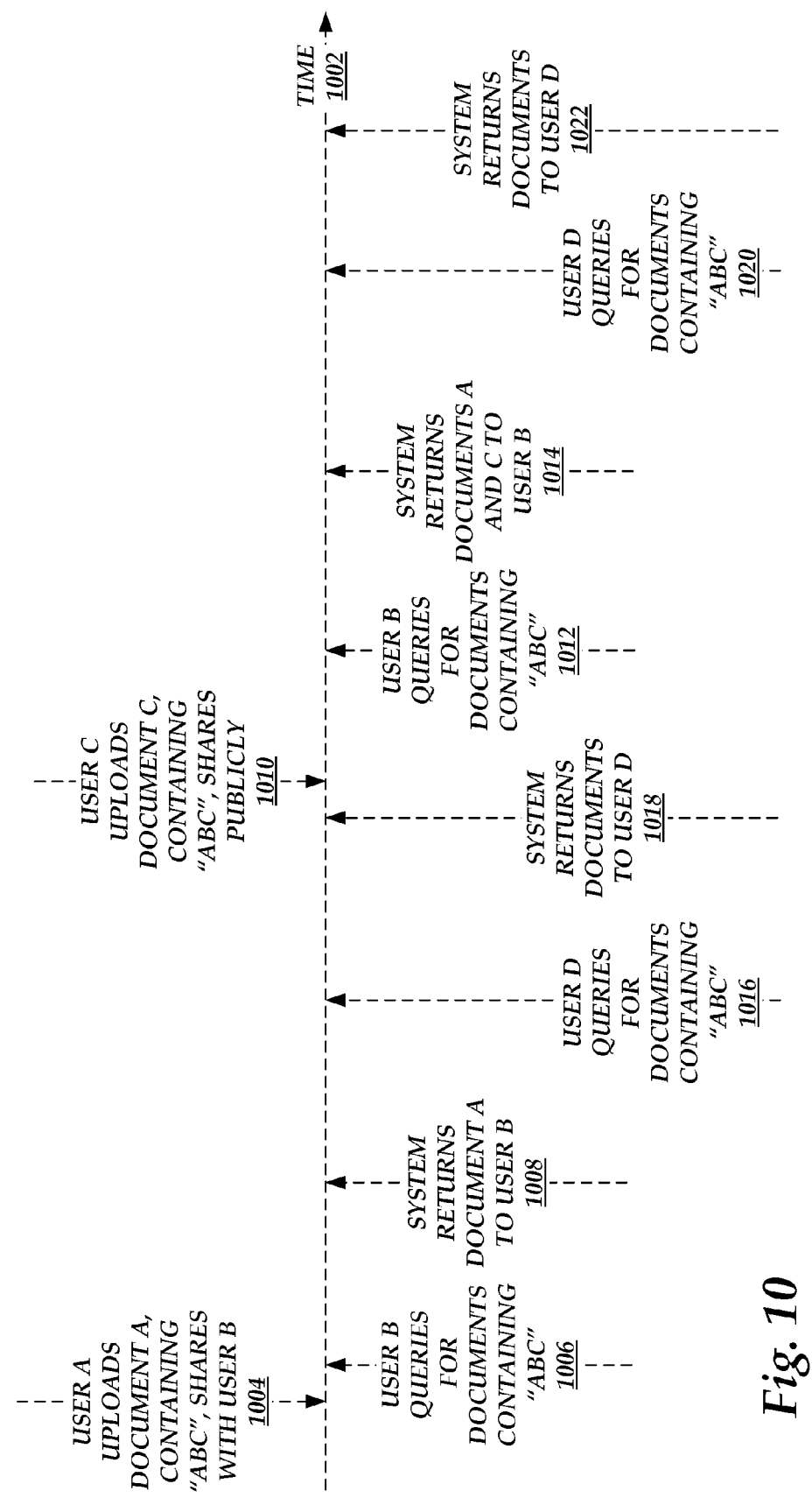
FIG. 10 is a timeline diagram illustrating the dynamic nature of the search corpora for various example searches and uploads performed over time.

FIG. 10 provides a timeline, denoted generally at 1000, illustrating the dynamic nature of the search corpora over time. FIG. 10 also illustrates how this dynamic nature may affect the results of example searches performed over time.

Turning to FIG. 10 in more detail, FIG. 10 illustrates a series of events occurring sequentially at arbitrary times along a time axis 1002. As represented generally at 1004, a given user A uploads a given document A. This document A may contain the example text "ABC", and the user A may share the document A with another user B.

In response to the upload represented at 1004, the dynamic indexing and searching system 110 may update the search corpus associated with the user A to include the document A. In addition, the system 110 may also update the search corpus associated with the user B to include the document A.

As represented generally at 1006, the user B may query within his or her search corpus for any documents containing the text "ABC". Because of the upload 1004, the search corpus for the user B now contains to the document A, which in turn contains a hit for the search text "ABC". Accordingly, as represented generally at 1008, the system 110 would return at least the document A to the user B.

As represented at 1010, another user C uploads another document C, which also contains the example text "ABC". In addition, this user C shares this document C publicly. In response to this upload 1010, the system 110 would update the respective corpora for the users A, B, and C to include the newly uploaded document C.

As represented at 1012, if the user B repeats the previous query for documents within his or her search corpus containing the example text "ABC", this query will now return documents A and C, as represented generally at 1014. The dynamic nature of the search corpora for the different users is illustrated by this example, in which the same search performed by the same user returns different results at different times.

To illustrate further the flexibility of the dynamic networks and search corpora, FIG. 10 also depicts processing associated with a further representative user D, shown for contrast with the processing performed for the user B. For example, as shown at 1016, the user D may query for all documents containing "ABC". Some time later, as shown at 1018, the system may return a set of documents to user D in response to the query represented at 1016.

As represented generally at 1020, the same user D may repeat the query for all documents containing "ABC", with the query performed at 1020 being the same as that performed at 1016. In response to the query represented at 1020, the system may return the same set of documents to the user D, as represented generally at 1022. More specifically, the set of documents returned to the user D at 1022 may be the same as the documents returned to that user at 1018. In contrast, the user B received a different set of documents when performing the same query at different times, as represented at 1008 and 1014. However, the networks associated with the users B and D may be different, resulting in these different users receiving different results when performing the same queries at different times. Any examples shown, the user B receives different results to the same query performed at different times, while the user D receives the same results to the same query performed at different times.

The foregoing description provides technologies for indexing and searching dynamically changing search corpora. Although the this description incorporates language specific to computer structural features, methodological acts, and computer readable media, the scope of the appended claims is not necessarily limited to the specific features, acts, or media described herein. Rather, this description provides illustrative, rather than limiting, implementations. Moreover, these implementations may modify and change various aspects of this description without departing from the true spirit and scope of this description, which is set forth in the following claims.

We claim:

1. A dynamic indexing and search system comprising:
   at least one processor;
   an online document repository;
   a computer-readable storage medium having stored thereon computer-executable instructions that, when loaded into the at least one processor and executed, cause the at least one processor to
   receive a search request from a user device;
   extract a user identifier, one or more search terms, ranking preferences, and representations of a plurality of search scopes from the received search request, the ranking preferences for increasing or decreasing the rank of search results identified within each associated search scope;
   filter documents contained within the online document repository based on the user identifier and the search scope, each document in the online document repository having a document type that is specified by a share permission associated with each respective document, each share permission having been provided by an uploading user when the respective document was uploaded to the online document repository, wherein share permissions of the documents collectively define the plurality of search scopes of the documents; search the filtered documents for any occurrences of the one or more search terms to generate search results;
   rank the generated search results in the plurality of search scopes based on the ranking preferences, the ranking preferences controlling display of documents in the ranked search results by rank and according to the document type; and
   return the ranked search results containing representations of any occurrences of the one or more search terms within the filtered documents in response to the search request received from the user device, the returned ranked search results being configured for display on the user device by rank and according to the document type.

2. The dynamic indexing and search system of claim 1, wherein the plurality of search scopes comprises one or more of a search scope that includes documents uploaded by the uploading user, a search scope that includes documents available for searching by all users of the online document repository, and a search scope that includes all documents made available to a user for searching.

3. The dynamic indexing and search system of claim 1, wherein each search scope specifies a subset of the documents which is searchable by a given user for occurrences of at least one user-specified search term.

4. The dynamic indexing and search system of claim 1 in which the document types include one of document owner, shared on a restricted basis, or shared on a public basis.

5. The dynamic indexing and search system of claim 1, wherein the computer-readable storage medium has further computer-executable instructions stored thereon which, when executed on the at least one processor, cause the dynamic indexing and search system to receive repetitive activations from a user device to specify a desired ranking of search results within each associated search scope.

6. The dynamic indexing and search system of claim 1, wherein the computer-readable storage medium has further computer-executable instructions stored thereon which, when executed on the at least one processor, cause the dynamic indexing and search system to:
   receive one or more upload documents for the online document repository from a user device;
   identify an owner user of each upload document;
   extract at least one share permission from each upload document; and
   store owner-specified share permissions for each document, the owner-specified share permissions specifying a type for each upload document.

7. A computer-implemented method for dynamic indexing and searching, the computer-implemented method comprising executing instructions in a computer system to perform the operations of:
   receiving a search request from a user device by way of one or more computer systems;
   extracting a user identifier, one or more search terms, ranking preferences, and representations of a plurality of search scopes from the received search request by way of one or more computer systems, the ranking preferences for increasing or decreasing the rank of search results identified within each associated search scope;
   filtering documents contained within an online document repository based on the user identifier and the search scope by way of one or more computer systems, each document in the online document repository having a document type that is specified by a share permission associated with each respective document, wherein share permissions of the documents collectively define the plurality of search scopes of the documents;
   searching the filtered documents for any occurrences of the one or more search terms to generate search results by way of one or more computer systems;

ranking the generated search results in the plurality of search scopes based on the ranking preferences by way of one or more computer systems, the ranking preferences controlling display of documents in the ranked search results by rank and according to the document type; and returning the ranked search results containing representations of any occurrences of the one or more search terms within the filtered documents in response to the search request received from the user device by way of one or more computer systems, the returned ranked search results being configured for display on the user device by rank and according to the document type.

8. The computer-implemented method of claim 7, wherein the share permission is provided by an uploading user when the document is uploaded to the online document repository.

9. The computer-implemented method of claim 8, wherein the plurality of search scopes comprises one or more of a search scope that includes documents uploaded by the uploading user, a search scope that includes documents available for searching by all users of the online document repository, and a search scope that includes all documents made available to a user for searching.

10. The computer-implemented method of claim 7, wherein each search scope specifies a subset of the documents which is searchable by a given user for occurrences of at least one user-specified search term.

11. The computer-implemented method of claim 7 in which the document types include one of document owner, shared on a restricted basis, or shared on a public basis.

12. The computer-implemented method of claim 7, further comprising executing instructions in a computer system to perform the operations of:

causing the dynamic indexing and search system to receive repetitive activations from a user device to specify a desired ranking of search results within each associated search scope.

13. The computer-implemented method of claim 7, further comprising executing instructions in a computer system to perform the operations of:

receiving one or more upload documents for the online document repository from a user device by way of one or more computer systems;

identifying an owner user of each upload document by way of one or more computer systems;

extracting at least one share permission from each upload document by way of one or more computer systems; and storing owner-specified share permissions for each document by way of one or more computer systems, the owner-specified share permissions specifying a type for each upload document.

14. A computer-readable storage medium that is not a signal having computer-executable instructions stored thereupon that, when executed by a computer, cause the computer to:

receive a search request from a user device;

extract a user identifier, one or more search terms, ranking preferences, and representations of a plurality of search scopes from the received search request, the ranking preferences for increasing or decreasing the rank of search results identified within each associated search scope;

filter documents contained within a document repository based on the user identifier and the search scope, each document in the document repository having a document type that is specified by a share permission associated with each respective document, wherein share permissions of the documents collectively define the plurality of search scopes of the documents;

search the filtered documents for any occurrences of the one or more search terms to generate search results;

rank the generated search results in the plurality of search scopes based on the ranking preferences, the ranking preferences controlling display of documents in the ranked search results by rank and according to the document type; and return the ranked search results containing representations of any occurrences of the one or more search terms within the filtered documents in response to the search request received from the user device, the returned ranked search results being configured for display on the user device by rank and according to the document type.

15. The computer-readable storage medium of claim 14, wherein the share permission is provided by an uploading user when the document is uploaded to the document repository.

16. The computer-readable storage medium of claim 15, wherein the plurality of search scopes comprises one or more of a search scope that includes documents uploaded by the uploading user, a search scope that includes documents available for searching by all users of an online document repository, and a search scope that includes all documents made available to a user for searching.

17. The computer-readable storage medium of claim 14, wherein each search scope specifies a subset of the documents which is searchable by a given user for occurrences of at least one user-specified search term.

18. The computer-readable storage medium of claim 14 in which the document types include one of document owner, shared on a restricted basis, or shared on a public basis.

19. The computer-readable storage medium of claim 14, wherein the computer-readable storage medium has further computer-executable instructions stored thereupon that, when executed by a computer, cause the computer to receive repetitive activations to specify a desired ranking of search results within each associated search scope.

20. The computer-readable storage medium of claim 14, wherein the computer-readable storage medium has further computer-executable instructions stored thereon which, when executed on the at least one processor, cause the dynamic indexing and search system to:

receive one or more upload documents for the online document repository from a user device;

identify an owner user of each upload document;

extract at least one share permission from each upload document; and store owner-specified share permissions for each document, the owner-specified share permissions specifying a type for each upload document.

* * * * *